UNITED STATES PATENT OFFICE.

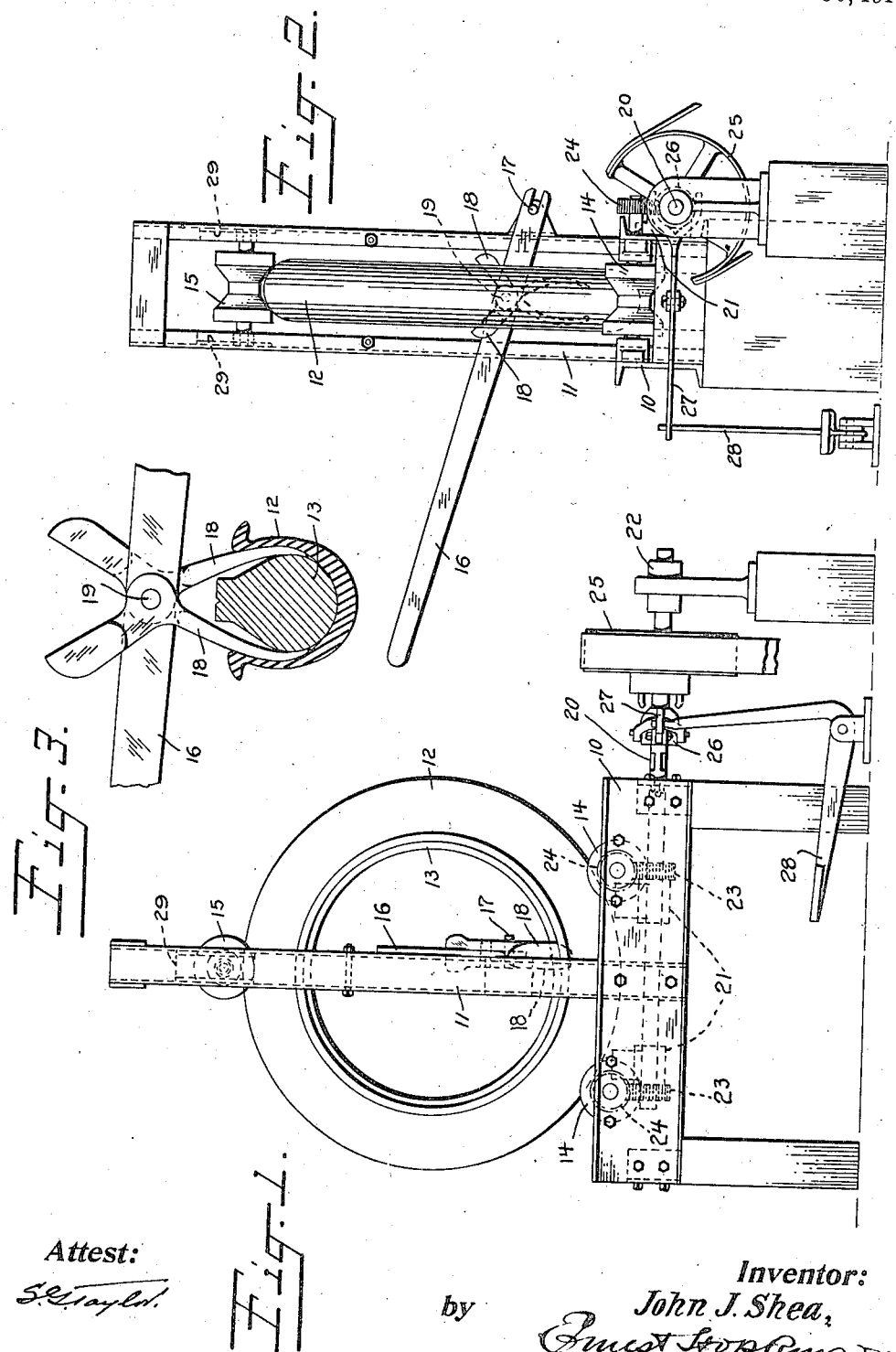

JOHN J. SHEA, OF HARTFORD, CONNECTICUT, ASSIGNOR TO THE HARTFORD RUBBER WORKS COMPANY, A CORPORATION OF CONNECTICUT.

APPARATUS FOR SEPARATING TIRES FROM CORES.

1,326,294.　　　　　Specification of Letters Patent.　　Patented Dec. 30, 1919.

Application filed November 27, 1916. Serial No. 133,595.

*To all whom it may concern:*

Be it known that I, JOHN J. SHEA, a citizen of the United States, residing at Hartford, county of Hartford, and State of Connecticut, have invented certain new and useful Improvements in Apparatus for Separating Tires from Cores, of which the following is a full, clear, and exact description.

This invention relates to tire building machines and has for an object to provide a device for separating tires from the cores upon which they are vulcanized.

In the manufacture of tires, it is customary to vulcanize the tire with a metal core within it. The tire adheres sufficiently to the core after vulcanization to make it quite difficult to manually strip the tire from the core. The present invention provides a device for separating the tire from a core for a distance of several inches from the edges of the tire so that the tire may be easily and quickly removed from the core.

The invention can be easily understood from the following description taken in connection with the accompanying drawing in which—

Figure 1 is a side elevation of apparatus constructed in accordance with my invention.

Fig. 2 is an end elevation of the same.

Fig. 3 is a detail view showing the separating fingers.

Referring now to the drawing in which like characters of reference designate similar parts, 10 designates a frame from which rises a standard 11 that is adapted between its sides to receive a vulcanized tire 12 with a metal core 13 within it. A pair of driven pulleys 14 are secured to the frame 10, and support as well as rotate the tire and core as a unit. An idler pulley 15 is arranged near the top of the standard and coöperates with the pulleys 14 in positioning the tire to revolve in a path between the sides of the standard.

A lever 16 passes across the standard and through the core as shown in Fig. 2, and is provided with a forked end to removably engage a pivot pin 17 on the standard. The lever is equipped between the sides of the standard with a pair of fingers 18 which are pivotally connected to the lever as shown at 19, and when the lever 16 is depressed, are adapted to enter between the edges of the tire 12 and core 13, as best shown in Fig. 3. The fingers are curved outwardly as shown whereby as they advance between the edges of the tire the edges will be separated and spread outwardly from the core. By virtue of the fingers being pivotally connected to the lever they readily move relatively to each other and to the lever during depression of the lever and adjust themselves to the curvature of the tire and core so that the tire is not mutilated.

For driving the pulleys 14 a drive shaft 20 is mounted in suitable bearings 21—22 and is provided with gears 23 that mesh with gears 24 on the shafts of the pulleys 14. A belt pulley 25 forms means for driving the shaft 20, there being a clutch 26 on the shaft, operated by levers 27—28, to connect the belt pulley with and disconnect it from the shaft.

In operation, the tire with a metal core within it is positioned between the pulleys 14 and pulley 15, the latter sliding upwardly in guides 29 in the standard during application of the tire to adjust itself to the size of the tire. The lever 16 is then inserted through the core and applied to the pivot pin 17 with the fingers 18 lying at the edges of the tire in position to be forced between the tire and core. The machine is now started by depressing the lever 28 which operates the clutch 26. During rotation of the tire and core as a unit past the fingers, the operator depresses the lever 16 thereby forcing the fingers inwardly between the edges of the tire and core so that the edges are separated from the core and spread outwardly therefrom for a distance of several inches. After several revolutions have been made by the tire the machine may be stopped, the lever 16 detached, and the tire with the core within it removed from the apparatus. Manual removal of the tire thus partially separated from the core may be now easily and quickly performed.

Although I have described a specific embodiment of the invention I do not wish to be limited to the exact construction illustrated and described since various modifications may be resorted to within the scope of the appended claims without departing from the spirit or sacrificing any of the advantages of the invention.

Having thus described my invention, what I claim and desire to protect by Letters Patent is:

1. Apparatus for separating tires from cores comprising a support for a tire, and means for separating the sides of the tire from the core around substantially the entire circumference of the core.

2. Apparatus for separating tires from cores comprising a support for a tire, a separating tool, and means for moving the tool and tire relatively to each other to cause the tool to pass between the core and tire for substantially the entire circumference of the tire.

3. Apparatus for separating tires from cores comprising a support for a core, a separating tool, means for relatively moving the tool and core radially, and means for revolving the core to provide relative movement of the tool and core whereby the former passes around the latter circumferentially.

4. Apparatus for separating tires from cores comprising a support for a core, a separating tool, a support for the separating tool, one of said supports being adapted to be actuated to provide relative radial movement between the core and tool, said supports coöperating to restrict the separating tool to a bodily movement in a substantially radial direction only relative to the core and means for rotating the core relative to the tool, whereby the adhesion between the tire and the core is broken while maintaining the core within the tire throughout its circumference.

5. Apparatus for separating tires from cores comprising a support adapted to support the tire from the exterior thereof, a separating tool, and a support for the separating tool, one of said supports being adapted to be actuated to provide relative radial movement between the core and tool, said supports coöperating to restrict the separating tool to a bodily movement in a substantially radial direction only relative to the core.

6. Apparatus for separating tires from cores comprising a support for supporting the tire exteriorly thereof, a separating tool, a support for the tool adapted to be disposed within the inner circumference of the core when in supported position, and means for actuating the said first support to thereby move the tire relatively to the separating tool.

7. Apparatus for separating tires from cores, comprising a support for a core and a pair of separating tools adapted to operate on opposite sides of the core, and means for relatively moving the tools and core throughout the entire circumference of the core whereby the former pass between the latter and the tire.

8. Apparatus for separating tires from cores comprising a support for a core, a separating tool, a support for the tool adapted to be operated to move the tool radially of the core, and actuating means whereby the core and tire may be revolved simultaneously with the radial movement of the tool.

9. Apparatus for separating tires from cores comprising a support for a core, and means for progressively separating both side walls of the tire from the core entirely around the circumference of the latter and simultaneously for a progressively greater extent radially.

10. Apparatus for separating tires from cores comprising a support for a core, means for rotating the core, and means for separating the side walls of the tire from the core to a progressively greater extent in a radial direction as the core rotates.

11. Apparatus for separating tires from cores comprising a support for a core and its tire, a pair of pivotally connected separating fingers, means for rotating the core and tire, and means for projecting said fingers between the core and the opposed side walls of the tire.

12. Apparatus for separating tires from cores comprising means for peripherally supporting and rotating a tire containing a core, a separating tool located within the inner circumference of the tire in opposed relation to said means, and means for radially advancing said tool between the core and tire.

13. Apparatus for separating tires from cores comprising a support for a core, a separating tool, and means whereby the core and tool may be simultaneously given a relative movement both radially and circumferentially of the core.

Signed at Hartford, Conn., this 15 day of November, 1916.

JOHN J. SHEA.